US006925475B2

(12) United States Patent
Essafi et al.

(10) Patent No.: US 6,925,475 B2
(45) Date of Patent: Aug. 2, 2005

(54) PROCESS AND APPARATUS FOR MANAGEMENT OF MULTIMEDIA DATABASES

(75) Inventors: Hassane Essafi, Orsay (FR); Michel-Pierre Gayrard, Bois-Colombes (FR); Marc Pic, Paris (FR); Pascal Adam, Gentilly (FR)

(73) Assignee: Commissariat a l'Energie Atomique, Paris (FR)

( * ) Notice: Subject to any disclaimer, the term of this patent is extended or adjusted under 35 U.S.C. 154(b) by 292 days.

(21) Appl. No.: 10/270,271

(22) Filed: Oct. 11, 2002

(65) Prior Publication Data

US 2003/0126147 A1 Jul. 3, 2003

Related U.S. Application Data

(60) Provisional application No. 60/377,268, filed on May 2, 2002.

(30) Foreign Application Priority Data

Oct. 12, 2001 (FR) ............................................. 01 13222

(51) Int. Cl.[7] .............................................. G06F 17/30
(52) U.S. Cl. ...................... 707/104.1; 705/58; 713/176; 709/223; 717/178
(58) Field of Search ...................... 707/104.1; 717/178; 713/176; 705/58; 709/223

(56) References Cited

U.S. PATENT DOCUMENTS

| 5,701,451 | A | * | 12/1997 | Rogers et al. | ................. 707/1 |
| 5,706,365 | A | | 1/1998 | Rangarajan et al. | ........ 382/230 |
| 5,794,177 | A | | 8/1998 | Carus et al. | ..................... 704/9 |
| 6,272,635 | B1 | * | 8/2001 | Saito | .......................... 713/176 |
| 6,347,398 | B1 | * | 2/2002 | Parthasarathy et al. | ..... 717/178 |
| 2002/0112162 | A1 | * | 8/2002 | Cocotis et al. | .............. 713/176 |
| 2002/0178251 | A1 | * | 11/2002 | Takats et al. | ............... 709/223 |

FOREIGN PATENT DOCUMENTS

| WO | WO 99/59083 | 11/1999 |
| WO | WO 00/52590 | 9/2000 |

OTHER PUBLICATIONS

M.J. Hu, et al., "Multimedia Description Framework (MDF) for content description of audio/video documents", Digital 99 Libraries, 4th. ACM Conference on Digital Libraries, Berkeley, CA, Aug. 11–14, 1999, ACM Conference on Digital Libraries, New York, NY: ACM, US, Aug. 11, 1999, pp. 67–75.

O. Friesen, et al., "Multimedia information systems: the confluence of multiple technologies", Singapore ICCS/ISITA '92, Communications on the Move, Singapore, Nov. 16–20, 1992, New York, NY, USA, IEEE, US, Nov. 16, 1992, pp. 969–973.

L. Wood, "Programming the Web: the W3C DOM specification", IEEE Internet Computing, IEEE Service Center, Piscataway, NJ, US, vol. 3, No. 1, Jan. 1999, pp. 48–54.

* cited by examiner

*Primary Examiner*—Charles Rones
(74) *Attorney, Agent, or Firm*—Weingarten, Schurgin, Gagnebin & Lebovici LLP (57) ABSTRACT

The management system comprises a set of specialized operational units with an acquisition module, a multimedia database, indexing and search agents that can be subdivided into subagents, an agent dedicated to managing information relating to the structure of documents, a module for analyzing and structuring document components, a user interface including a document indexing interface and a document search interface, a module for creating a multimedia database, and a module for opening a session. The management system also comprises a set of specialized functional units with an agent for arranging the various units of the system, agents for driving document indexing and searching, and an identifier manager. A platform provides interconnection and intercommunication between the specialized operational functional units.

10 Claims, 6 Drawing Sheets

FIG.11
Max: 97704 (86%)   Min: 0   Avg: 154

FIG.8

$\sum_{0,T} H(i)$ $H(i)$

Max (I)

T

CUMULATIVE OVER SIZE T

FIG.12
Max: 2840 (1%)   Min: 0   Avg: 119

FIG.9

For any inquiries concerning the Authentic Adventure

FIG.10

PROCESS AND APPARATUS FOR MANAGEMENT OF MULTIMEDIA DATABASES

Priority is claimed under 35 USC §119(e) of the following provisional application 60/377,268, filed May 2, 2002.

The present invention relates to a method and a system for managing multimedia databases.

With the digital revolution, the democratization of systems for producing, storing, and transporting multimedia data (texts, photos, videos, animated or still objects, sounds, . . . ), and with the merging of technologies derived from telecommunications, radio and TV, and computing, the volume of data issued and available on the Internet is exploding in a manner without precedence. This volume is estimated at about ten billion terabytes, and it is doubling every year. It is becoming essential to find solutions for facilitating disseminating, locating, and accessing the pertinent information that is available on the World Wide Web. In addition to the large volume of data to be handled, the major difficulty lies in developing a solution that makes it possible to cope with the wide variety of content in a multimedia document. A multimedia document is often made up of an assembly of components each being of a different nature (text, drawing, image, photograph, video, sound, signal, . . . ).

Various solutions have already been proposed for indexing and searching documents that are to be archived, however those solutions are for the most part dedicated to one particular type of document.

Thus, for example, U.S. Pat. Nos. 5,706,365 and 5,794,177 propose methods of indexing texts that are based respectively on the n-gram approach and on identifying the paradigm of the candidate word.

International patent application WO 99/59083 also relates to a system for managing documents in which text represents the dominant element of the documents.

The present invention seeks to make it possible automatically to assess a multimedia document overall both during steps of acquisition, structuring, indexing, and storage, and during the step of locating a multimedia document by content, within a parallel and distributed system for managing distributed multimedia databases.

The invention thus seeks to provide an operator with effective assistance in the task of accessing and creating multimedia content.

These objects are achieved by a multimedia database management system characterized in that it comprises:

a) a set of specialized operational units comprising at least:
 a1) an acquisition module;
 a2) a multimedia database;
 a3) at least one indexing agent that can be subdivided into at least two subagents each using a specific mode of processing;
 a4) at least one search agent that can be subdivided into at least two subagents each using a specific mode of processing;
 a5) an agent dedicated to managing information relating to document structure;
 a6) a module for analyzing the content of an input multimedia document and for extracting and structuring components from the document;
 a7) a user interface having:
  a7-1) a document indexing interface; and
  a7-2) a document search interface;
 a8) a module for creating, starting, and destroying a multimedia database; and
 a9) a module enabling a user to open a session and control the module for creating, starting, and destroying a multimedia database;

b) a set of specialized functional units comprising at least:
 b1) an agent for arranging various units of the system;
 b2) an agent for driving document indexing;
 b3) an agent for driving document searching; and
 b4) an identifier manager; and c) an interconnection and intercommunication platform for the specialized operational units and the specialized functional units.

More particularly, the indexing agent that can be subdivided into at least two subagents is an agent serving to index objects of image type, and the search agent that can be subdivided into at least two subagents is an agent serving to search for objects of image type.

According to a particular characteristic, the module for analyzing the content of an input multimedia document and for extracting the structure of document components comprises a first unit for processing and analyzing an image or a signal, for statistical analysis, for modelling, and for classification to group together the elements of an input document into homogeneous components, and a unit for producing the structure of the document or an object graph establishing the relationships between the various components of the document.

The system of the invention may comprise various indexing agents and search agents adapted to objects of types other than image type objects.

Thus, the system may comprise an indexing agent serving to index text type objects and a search agent serving to search for text type objects, or indeed an indexing agent serving to index sound type objects and a search agent serving to search for sound type objects.

The system of the invention may also comprise an analysis agent serving to extract image objects, sound objects, and objects characterizing the dynamics thereof, an indexing agent serving to index video type objects, and a search agent serving to search for video type objects.

The multimedia database comprises both references to documents to be archived and composite signatures constituted by characterizing components of archived documents and by descriptions of the structure of archived documents identifying the relationships between the components of archived documents.

Advantageously, the system of the invention comprises a plurality of modules for analyzing the content of an input multimedia document and for extracting and structuring components of the document, each of these modules for analyzing contents, extraction, and structuring being adapted to a specific type of document identified by the nature of its content (image, text, sound, video).

The invention also provides a method of managing a multimedia database, characterized in that it comprises the following steps:

creating an identifier allocator agent for associating a unique reference with each representative element of a multimedia document at each step of the processing;

acquiring a multimedia document of heterogeneous content comprising information belonging to at least one of the following categories: image, video, sound, text, animated vector graphics;

indexing the multimedia document, where indexing comprises:
 a1) analyzing the multimedia document both to extract homogeneous components each belonging to a category of the same type, and also to extract relationships between said homogeneous components;

b1) characterizing the content of each of the homogeneous components and establishing relationships between the elements of the content of each of said homogeneous components;

c1) establishing the relationships if any between the elements belonging to the contents of different homogeneous components; and d1) producing a composite signature combining the indices of each of the homogeneous components, the previously identified relationships, and all of the previously acquired identifiers;

storing the indexed multimedia document together with its composite signature; and searching a multimedia document as previously indexed and stored on the basis of a composite request, searching comprising:

a2) analyzing the composite request to extract firstly homogeneous requests referring to a category of a single type, and secondly user constraint relationships expressed in the composite request;

b2) processing homogeneous requests;

c2) formulating results of processing homogeneous requests while taking user constraint relationships into account; and d2) establishing a pertinence order for the results and presenting the results.

According to an advantageous characteristic, while searching for a previously indexed and stored multimedia document, during the processing of homogeneous requests, the response returned by a search agent is constituted by a sequence of triplets each comprising: a similarity score after comparing the composite signatures of requests with the composite signatures prepared during the indexing stage; the identifier of the object associated during the indexing stage with the original document; and the identifier of a component of the homogeneous request.

The various modules of the system of the invention make use of the complementarity of the information provided by each component of a multimedia document and, during the archiving and indexing stage, they make it possible to enrich the description of the content of the document, said enriched description constituted by the composite signature of the document then serving during the search stage to identify the document that is the most pertinent. During the search stage, a user interface interacts with the system by using composite requests made up of one or more individual or "atomic" requests (e.g. concerning pictures, texts, or sounds).

Other characteristics and advantages of the invention appear from the following description of particular embodiments, given as examples and with reference to the accompanying drawings, in which.

Figure 1:
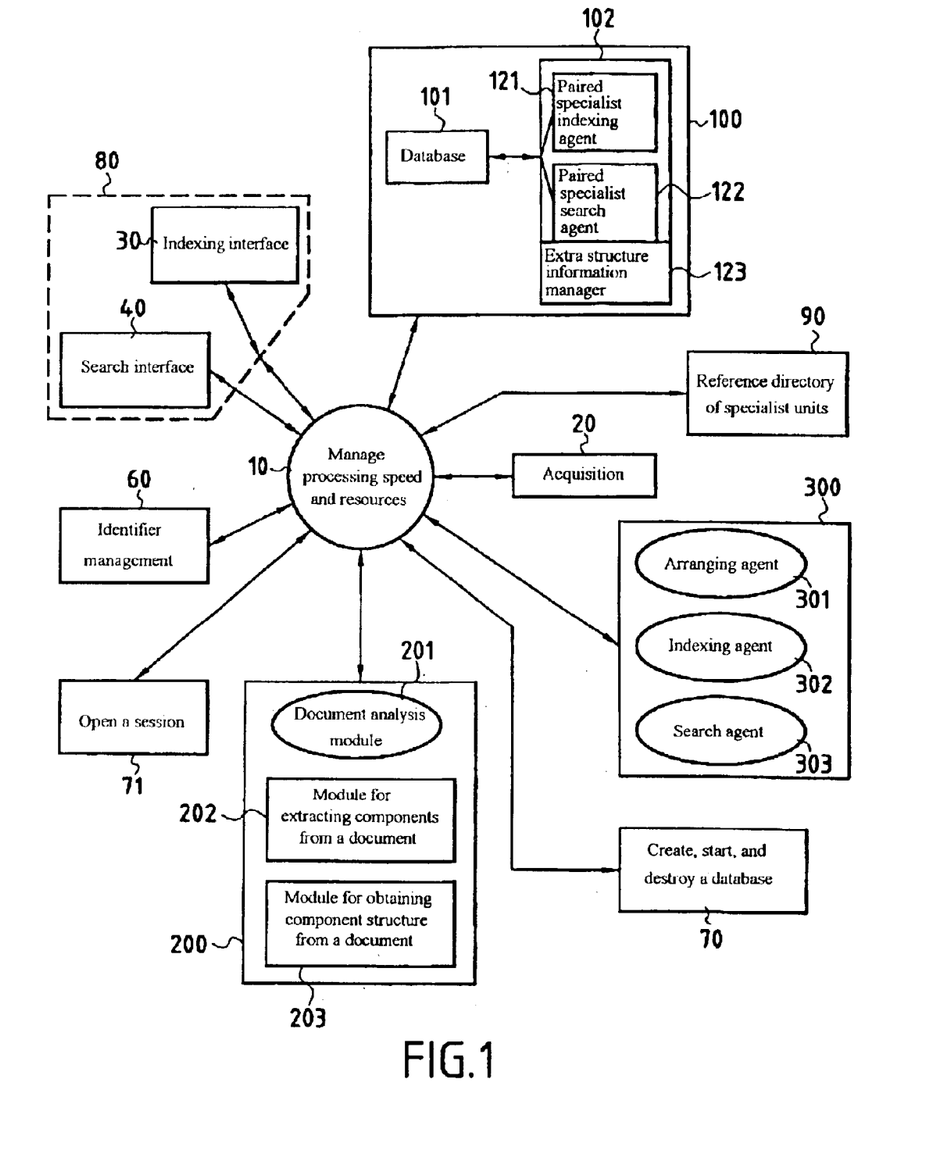
FIG. 1 is a block diagram showing the general architecture of the system of the invention for managing a multimedia database.

With reference initially to FIG. 1, the general architecture of a system of the invention for managing multimedia databases is described.

The management system of the invention comprises an interconnection and intercommunication platform 10 between specialized operational units and specialized functional units. This platform 10 is in the form of a software bus and tools for managing resources and it serves to manage and optimize connections between heterogeneous modules and thus constitutes a unit for managing resources and processing speed.

The platform 10 serves to interconnect, orchestrate, and cause to work together the agents that are needed for the activities of indexing and searching for a multimedia document, which document may contain simultaneously text, images, video signals, and audio signals.

The platform 10 acts on two levels: firstly in integrating and coordinating distributed agents; and secondly in managing and optimizing the resources of the system.

Integrating and coordinating distributed agents implies that the following points must be taken into account:

the locations of the objects of each of the agents, which locations may be distributed over a plurality of machines interconnected via the Internet or an Intranet, for example;

the heterogeneity of the agents which may have been designed to operate independently, or which may have been developed under a variety of programming environments and/or languages (JAVA, C, C++, FORTRAN, UNIX, NT, WINDOWS, . . . );

switching and transferring data between the agent of the platform, to do this, various communications protocols may be used as a function of the applications and may be based in particular on the following:

on UDP/IP or RTP/RTSP protocol for transferring images or video signals in non-connected mode, and thus in real time;

the TCP/IP protocol for transferring data in which transfer reliability is more important than transfer time; and the CORBA and JAVA protocols used by default for transferring any type of object;

parallelism and multiprogramming which enable computation time to be reduced by making tools available that enable a plurality of agents or subagents of this given agent to execute in parallel.

The management and optimization of resources (machines, communications media, processing agents, ... ) imply three functions each corresponding to a particular type of operator.

From an administrative point of view, the platform 10 serves to define the resources necessary for the application.

From the applications design point of view, the platform 10 enables an object or an agent to be referenced without concern for its location, it enables an appropriate communications protocol to be selected, and it provides tools for operating in parallel, distributing tasks, and balancing loads.

From the points of view use for indexing or for searching, the platform 10 enables interchanges to take place between the client and the server.

A plurality of specialized operational central units co-operate with the platform 10.

A module 70 constitutes a media base manager and is used by the administrator to create, start, and destroy a multimedia database (or "media base").

The media base manager 70 is present at each computation node contributing to the configuration. On being started, the media base manager 70 analyzes the local configuration (to determine whether it is possible locally to activate particular services such as text indexing, image indexing, optical character recognition, a database server, ... ), and it starts the specialized agents which must be hosted locally. The media base manager 70 then registers itself in the naming service (reference directory 90 of specialized units) so that clients can find it and make connections to it.

A media base is created via a module 71 for opening and running a session which connects and opens a session on the media base manager 70. The module 71 supplies a file which constitutes the configuration of the resources of the media base. Each media base manager 70 involved in the configuration is responsible for execution of the portion of the requests of the machine on which it is placed.

When starting a media base dedicated to a particular application, all of the agents and subagents of the media base which need to be hosted in the same machine as the media base manager 70 are activated.

Activating an agent consists in creating a copy of the agent in memory, connecting the agent to the bus of the platform, and registering the agent with the naming service.

A user interface 80 which constitutes a specialized operational central unit is connected to the platform 10 and comprises a document indexing interface 30 and a document search interface 40.

The user interface 80 thus enables a user firstly to archive and index documents, and secondly to express requests and recover the documents specified in response thereto.

The identifier manager 60 connected to the platform 10 constitutes a specialized functional unit serving to provide a reference or a packet of references that are free and unused, for identifying each document of the database or the components coming from a single document of the database by means of a unique reference.

In order to be sure that each entity (document, question, or component) present in the system has a unique identifier, the identifier manager 60 provides a reference that has not been used on each occasion it is invoked.

The identifier manager 60 also proceeds to release identification references after the disappearance of a document or a question that has received a response.

An important aspect of the database manager system of the invention is constituted by the organization of the multimedia databases or media bases which comprise respective sets of operational and functional specialized units dedicated to a particular application (for example managing video documents, managing paper documents).

The operational units of a media base essentially comprise:

an acquisition module 20;
a media processor 200; and
a memory module 100.

A media base also groups together functional units within a document server 300.

The acquisition module 20 drives the various acquisition systems (scanner, camera, server accessible over the Internet, ... ) and converts the formats of incoming documents into an internal format.

The acquisition module 20 is thus the agent serving to open and read the content of a document for archiving. It is made up of various methods, each being adapted to reading a particular type of document. Incoming documents can thus be of the following types, for example, TIFF, GIF, JPEG, AVI, or MPEG.

Invocation of a method adapted to a particular type of document causes the document to be read, and as its result, it returns an object (in the computer sense) grouping together the data and the methods of accessing said data. By way of example, one method implemented in an acquisition module 20 may return the pixel value of a given position when it is applied to an object of the image type or the frame of a given position when it is applied to an object of the video type.

The media processor 200 comprises a document analysis module 201, a component extraction module 202 for extracting components from the document, and a component structuring module 203 for structuring the components of the document.

The media processor 200 is the first agent to be called during the stage of archiving documents. It analyzes the content of the document to be indexed in order to produce a structural description of the document describing its components and the relationships linking them together. The document analyzer module 201 and the component extractor module 202 have various tools for processing and analyzing images or signals (wavelets, filtering, outline detection, uniformity analysis, texture, pairing, ... ), for statistical analysis, for modelling/training, and for classification. Their role is to group elements together (pixels of an image, frame of a video signal, sample of a document signal) into homogeneous components (shots in a video signal, text areas within a frame or an image, graphics zones, sound objects, ... ) which are classified so as to be sent subsequently to the appropriate indexing agents. The first step of the process consists in associating each element of the document with an attribute (a vector of values) which serves to determine whether two adjacent elements are similar or not, and thus whether they can be grouped together or not. The second step consists in determining the type of each homogeneous class.

Several methods are used for calculating the attribute matrix of the document made up of the value vectors associated with each of the elements of the document. One of the methods used is based on multiscale decomposition obtained by applying a wavelet transform (applying two linear filters, a lowpass filter and a highpass filter). Homogeneous components are determined by grouping together under the same label points which are adjacent and have attributes which are similar. The result of this operation is a labelled document used for defining homogeneous zones (in the original document) corresponding to connected points having the same label. The final step is devoted to identifying the type of each zone. To do this, statistical analysis techniques are applied to each of the zones. Each component is sent to an appropriate indexing agent. The content of the components may be destroyed and only the signature is retained. The original document is sent to the database 101 for archiving.

When the document for archiving contains text, it is possible to make use of an optical character recognizer (OCR) agent during the stage of analysis and component extraction, thus making it possible to encode the content of the textual components.

The component structuring module 203 produces the structure of the document. It makes use of the topological space of the components together with their semantic content in order to determine the relationship between the various components of the document and build the structural representation of the document. It may also rely on document type description (DTD) modelling the documents of the application. This is possible only if the field of the application is well defined and the documents are modelled by one or more DTDs.

The structure (object graph) produced in this way is stored in the database 101 and serves as a link between the various components of the multimedia document. Each embodiment (object) of the graph contains information enabling the original document to be found and locating the data zone corresponding to the component.

The memory module 100 serves to describe (index) the content of the various components making up the document and to archive this description together with the original documents.

The description characterized in the content of a multimedia document (i.e. a structured object presenting data and combining components of heterogeneous types such as image, sound, video, text) constitutes a composite signature or index for the multimedia document.

This description makes use of characterizations of the content of each component and also of characterizations of the relationships between the components.

The memory module 100 comprises a certain number of agents which work together to produce the composite signature characterizing the content of the database to be indexed. The same agents collaborate during the searching stage in order to extract and compare the signature in question or the composite request from the operator with the composite signatures of archived documents.

The agents and tools of the memory module 100 which may be hosted in the same machine or in different machines connected together by the Internet or by an Intranet, thus make it possible firstly to extract a composite signature finely characterizing the content and the structure of a document, and then store it, and secondly to locate documents containing particular information expressed in a question put by the operator.

The memory module 100 essentially comprises a multimedia database 101 and a set 102 of specialized operational agents.

The assembly 102 comprises at least one agent 121 for indexing components and for archiving, an agent 122 for searching for components, and an agent 123 for managing information relating to the structure of documents.

Each agent 121, 122 is dedicated to managing a particular type of document.

As an indexing and archiving agent 121 and as a search agent 122, it is possible to use an IMAS agent dedicated to managing picture information.

Each IMAS agent is itself made up of at least two subagents PIMAS1, PIMAS2, each using a specific processing mode for managing picture information and each allocating indices to the individual components of the image resulting from the specific processing to which the image is subjected in the PIMAS1 and PIMAS2 subagents. The composite signature of the image document is then made up from merging together the indices of the individual components produced by the PIMAS1 and PIMAS2 subagents.

Thus, indexing a list of picture components essentially comprises a step of computing the local index of each component, each component being processed independently of the other components in the list and of the content of the database, and a step of producing standardized signatures, e.g. by projecting the indices onto a reduced vector space representing the signatures, e.g. using an algorithm based on principal component analysis (PCA). For example, an image may be characterized by an overall color and by a local color.

As an indexing and archiving agent 121 and as a search agent 122, it is possible not only to use one or more IMAS agents dedicated to managing picture information, but also to use one or more AMAS agents dedicated to managing audio data, one or more VIDAS agents dedicated to processing video data, and one or more TEMAS agents dedicated to managing textual information.

Specialized operational agents for storing images and for storing text are provided for storing pixel data and pure text data respectively in the database 101.

The TEMAS agent specialized in indexing and searching for text documents can be used for interrogating a document database in natural language. In order to process a request, the TEMAS agent calculates the degree of semantic proximity between the question and all of the documents in the base, and then sorts the documents into an order depending on their degree of semantic proximity.

During a process of indexing a text, the text to be introduced into the database is subjected to linguistic processing and then to statistical processing.

For the linguistic processing, the objective is to extract and express the concept contained in a given text. The core of the TEMAS agent is constituted by a certain number of linguistic functions. This core relies on a dictionary of concepts, e.g. available in three languages (French, English, German, . . . ), which concepts can be general or private (i.e. associated with a particular theme or field), and rules for formulating questions. The principle of operation of said core is based on linguistic analysis both during indexing and when searching for information. This analysis makes it possible to recognize all forms of a word (conjugation, single/plural, acronym, . . . ), and to eliminate ambiguities (for example to distinguish between the French noun "or" [=gold] and the coordination conjunction <or >). Linguistic analysis provides other options such as recognizing linguistic dependencies such as "immigrant worker".

The purpose of statistical analysis is to weight lexical units to provide stronger discriminating power to the rarer concepts in the database.

A reformulation stage enables a question to be extended to equivalent expressions (oil and petroleum) and/or to clarify vague terms.

The TEMAS agent is designed in such a manner as to enable one or more cores to be integrated. An example of a core which can be integrated in the TEMAS agent is provided by the supplier TGID and named SPIRIT [syntactic and probabilistic system for indexing and searching textual information].

The memory module 100 also comprises a level comprising a certain number of specialized functional agents or tools serving in particular:

to arrange the various operational agents;

to unify and homogenize access to the services of the varying agents;

to hide the specific features, allocations, and implementation details of the agents;

to ensure that the various operational agents can interoperate with one another; and to provide a single high level representation of multimedia documents.

A media base comprises various functional units grouped together with a document server 300 which drives the document archiving and locating process and which thus serves to arrange the various agents of the system, to divide strategies for archiving an indexing document and for searching for documents, to authenticate information, and to assess its pertinence.

The document server 300 has an agent 301 for arranging the various units of the system, an agent 302 for driving document indexing, and an agent 303 for driving searches for documents, these agents communicating and co-operating via the platform 10.

The arranging agent 301 is intended to optimize hardware resources as a function of constraints defined by the user so that the processes of archiving and searching take place under the best possible conditions in the shortest times.

On analyzing the configuration chosen by the administrator, the arranging agent 301 devises an execution strategy enabling communications within a network to be reduced while also causing as much processing as possible to be performed in parallel within each agent.

By way of example, in a configuration having six IMAS agents dedicated to processing picture data, it is possible to have four IMAS agents (IMAS11, IMAS12, IMAS13, IMAS14) hosted on a first machine M1 and two IMAS agents (IMAS21, IMAS22) hosted on a second machine M2.

In another example, when representing a video signal, using first processing executed using a VIMAS agent dedicated to processing video data, followed by second processing performed on an image by means of an IMAS agent dedicated to processing picture information, if a plurality of agents IMASij (such as IMAS11, IMAS12, IMAS13, IMAS14, IMAS21, IMAS22) are available, then the arranging agent 301 establishes a policy of the arranger producer/consumer type between the VIMAS agent and the IMASij agents.

Once the VIMAS agent produces an image representing a sequence which has been identified, the image is allocated to the least heavily loaded individual indexing agent IMASij. The loading of an individual indexing agent IMASij is estimated as a function of the complexity of the objects present in its inlet queue, where complexity depends on size, homogeneity, . . . .

There follows a description of the process for indexing or archiving a multimedia document as driven by a document indexing driver agent 302.

Once the document server 300 has received a document for archiving, it begins by using the specialized unit reference directory 90 to retrieve the references of indexing and search agents such as the IMAS, TEMAS, AMAS, VIMAS agents.

A set of documents can be indexed in parallel as a function of the resources connected to the platform 10.

Each indexing group receives a packet of documents to be indexed, for example picture documents, each indexer establishing a local index which represents only the content of the images in the packet.

The results of local indexing are merged and possibly standardized within each group of indexers (e.g. a first group of indexers IMAS11, IMAS12, IMAS13, IMAS14 and a second group of indexers IMAS21, IMAS22).

Then overall merging is performed of the indexes produced for each image.

From the point of view of a user, the process of archiving a multimedia document is as follows:

The operator connects to the system via an access control process. Once this process has performed its verification successfully, a home window is displayed enabling the operator to use the indexing interface 30 to select the field of the application (e.g. scanned paper document, video, photo, sound, . . . ) and to select documents for archiving prior to launching the indexing process.

The indexing driver agent 302 receives the request, analyzes the arguments, and activates in order: the acquisition module 20 for opening and reading the content of the document that is to be archived; the media processor 200 which serves to extract the structure and the components making up the document; and the memory module 100 for producing the composite signature which serves to describe and represent the document.

Within the memory module 100, for each component extracted from the document, the document server 300 calls the appropriate indexing agent 121. Thus, the IMAS agent is called for indexing image type components, the TEMAS agent is called for indexing text type components, the AMAS agent is called for indexing sound signal type components, and the VIMAS agent is called for indexing video signal type components. The relationships between the various components which define the structure of the document are stored in the database 101. Thus, the database 101 saves only the composite signature and the original document. A report of the archiving process is sent to the client as the return value from the archiving method.

An example of a command instruction sequence for the indexing driver agent 302 is given below.

While there is a document to be indexed, do for (int i=0; i<documents.length; i++)
{
int documentId=idFactory.idNew0;
//activate MediaAcquisition
Media*med=media.Acquisition(documents[i]);
someComponent*components=mediaProcessing(med);
for (int j=0; j<components.length; j++)
{
int componenId=idFactory.idNew0;
switch(Components[j].type)
case TEXT: {traceTEMAS=TEMAS(documentId, componentId, components[j].Text);
    traceTextStore=addTextStore(documentId,compenentId, components[j].Text);
    break;
}
case PICTURE: (traceIMAS=IMAS(documentId, componentId,components [j].Picture);
    break;
{
if (success)
}
    traceImagStore=addImageStore(documentId,documents [i]);

traceMediaStruct=addStructStore(documentId, documents [j].Struct);
}}}

Figure 2:
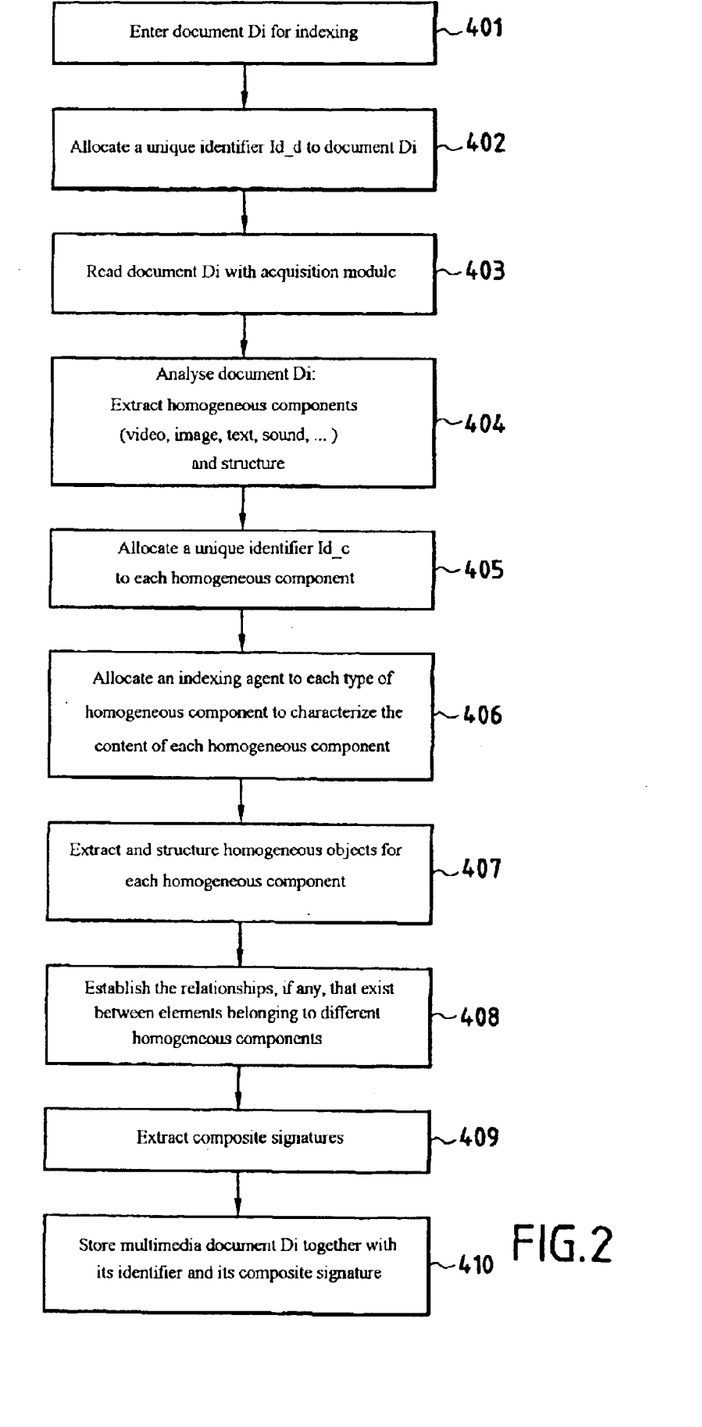
FIG. 2 is a flow chart showing the various steps in a method of the invention for indexing a multimedia document.

The main steps 401 to 410 of the method of the invention for indexing a multimedia document are summarized by the flow chart of FIG. 2.

Step 401 consists in inputting a document Di to be indexed.

Step 402 consists in allocating a unique identifier Id to document Di.

Step 403 consists in reading document Di with an acquisition module.

Step 404 consists in analyzing document Di with homogeneous components (video, image, text, sound, . . . ) being extracted and with structuring.

Step 405 consists in allocating a unique identifier $Id_c$ to each homogeneous component.

Step 406 consists in allocating an indexing agent to each type of homogeneous component in order to characterize the content of each homogeneous component.

Step 407 consists in extracting and structuring homogeneous objects for each homogeneous component.

Step 408 consists in establishing the relationships, if any, between elements belonging to different homogeneous components.

Step 409 consists in extracting composite separators.

Step 410 comprises storing the multimedia document Di together with its identifier and its composite signature.

Thus, in the invention, for a document Di that is to be archived, the method begins by extracting and structuring homogeneous components, and then for each type of homogeneous component, it proceeds with extracting and structuring homogeneous objects for each homogeneous component.

Furthermore, in an aspect of the invention, when extracting and structuring homogeneous objects for each homogeneous component, use is made of at least one two-part specialized indexing agent 121 (e.g. an IMAS agent) made up of at least two subagents (e.g. PIMAS1 and PIMAS2 agents), each using a specific mode of processing.

An example is given below of a segmenter agent for incorporation in the media processor 200 and applicable to processing paper documents containing both text and images. The segmenter agent serves to split up a document so as to feed different specialized indexing agents such as IMAS and TEMAS with picture elements and text elements, respectively. The structural relationships between the picture and text components are identified and are integrated in the composite signature stored in the database.

Electronic management of documents involves processing color images that have been scanned, comprising multiple backgrounds including zones of text, images, and graphics. The resolution used is generally 300 dots per inch (dpi) since good optical recognition of printed characters is then possible using conventional optical character recognition software. The method proposed above extracts the background of the document page (generally in A4 format) and then distinguishes between "text", "graphics", and "image" zones on the basis of statistical methods.

The segmentation can also be applied to conventional images so as to extract characteristic entities or objects, e.g.: sky, roof, road, car, etc.

By way of example, an image digitized in color using the JPEG format at a resolution of 300 dpi is considered.

In general, for A4 pages, i.e. 2480☐3500 pixels, that amounts to about 26 megabytes for red, green, and blue (RGB) encoding at 8 bits per plane. These images are transformed by transcoding RGB to HLS (hue, luminance, saturation). It is possible to process only the luminance portion so as to reduce the volume of the data. The size in the luminance band is about 8 megabytes.

Figures 8, 9:
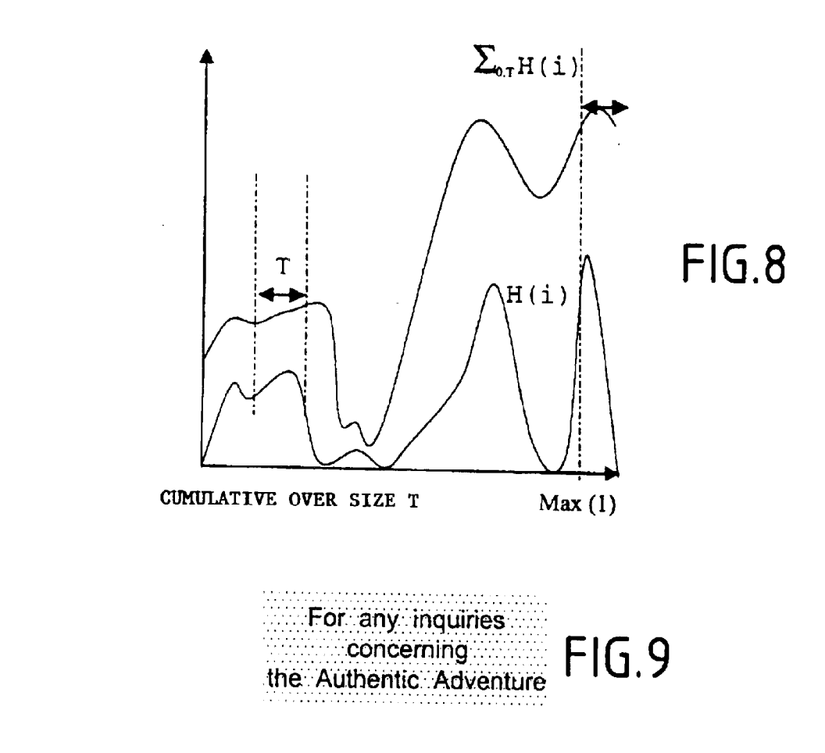
FIG. 8 is a histogram H(i) of the luminance band of an example of a multiple-background multimedia document, and also a cumulative histogram $\square_{o,T}H(i)$ over a segment of size T.
FIG. 9 shows a portion of the background of an image with characters that are not labelled.

The various backgrounds are extracted by performing successive searches for maxima in the cumulated histogram.

The method begins by computing a histogram H(i) over the luminance band (FIG. 8). Thereafter, the maximum in the cumulated histogram $H_c(n)$ is found in a segment of size T using the equation:

$$H_c(n) = \sum_{j=n,n+T} H(j) \text{ and } i = \max(H_c(j)_{j=0,255-T}) \tag{1}$$

For the first maximum obtained, i=Max(1), a label is propagated by applying a dynamic threshold, and for each labelled connecting region, its size in pixels is retained. A region is validated only if it is of sufficient size.

The value of the gray level of the pixel is written val.

The connected pixel from which labelling stems (i.e. which already forms part of the region) has the value ancval.

Static thresholding propagates the label only if the pixel value lies in the range i=Max(1) and i+T.

In contrast, dynamic thresholding is more tolerant:

A coefficient C is introduced in the method in order to be more flexible during labelling.

When the static criterion is not satisfied, i.e. when val does not lie in the segment [threshold, threshold+T], two tests are performed:

if threshold+T≦val and abs (val−ancval)≦T*C then threshold=val−T;

if val≦threshold and abs (ancval−val)≦T*C then threshold=val.

In the dynamic criterion, it can be seen that the threshold varies and is a function of the value of the pixel.

For a coefficient equal to 1, only pixels of value lying in the range i=Max(1)=original threshold to i+T are taken into account. If reduced to the case of static thresholding, the value of the threshold remains constant and is given by i=Max(1).

Labelling is propagated using 4 or 8 connectivity until there are no pixels that satisfy the criterion. It is then verified that the region being labelled is of sufficient size to enable it to be validated (introduction of a new parameter region__min__size). If its size is less than region__min__size, it is rejected.

The scanning of the image is continued while keeping the same value of i=Max(1).

Each pixel labelled during this first step (and whose region has been validated) has its value set to already__labelled.

The histogram computation is then repeated (taking account only of pixels that have not been labelled), and a new maximum i=Max(2) is found, after which dynamic thresholding is repeated.

This step is reiterated until at least 95% of pixels in the image have been processed.

At this step in the algorithm, the various different backgrounds making up the document have been extracted. "Text" or "character" zones lie within a background in the form of "non-labelled pixels" (FIG. 9).

Figure 10:
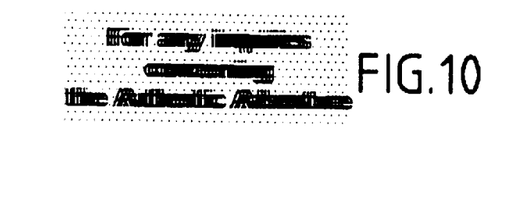
FIG. 10 shows up the text zone in the background portion of the FIG. 9 image after performing processing to plug holes and connect characters together.

A run length smoothing algorithm (RLSA) is applied vertically and horizontally in order to close holes and connect characters together (FIG. 10).

The "graphics" or "image" zones are unaffected or little affected by this operation.

The result of an RLSA smoothing method on a block of "image" type thus gives an image portion which is still seen as constituting a single block.

Thereafter, run length coding (RLC) is applied so as to extract the various (rectangular) blocks found in each background.

Finally, statistical methods are applied on these blocks in order to determine their nature (text, image, or graphics).

Figure 11:
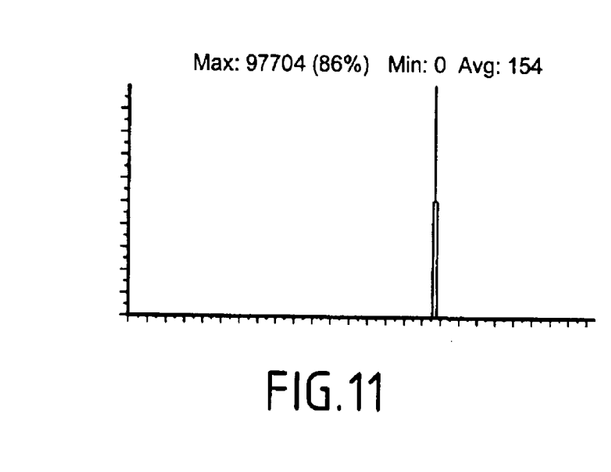
FIG. 11 shows an example of a histogram for the FIG. 9 block of text.
Figure 12:
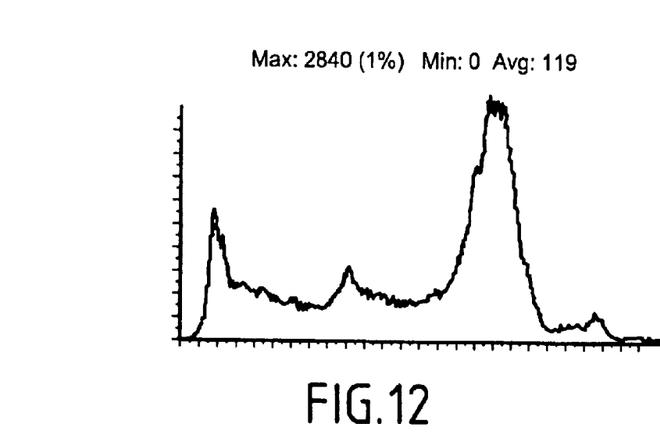
FIG. 12 shows an example of a histogram for an image block.

The measurements enabling these statistical methods to be applied are as follows:

measuring the size of the block;

computing the histogram within each block (enabling text, graphics, and image blocks to be distinguished). "Text" blocks have two peaks (the background and the characters), (FIG. 11), "graphics" blocks have a limited number of peaks, and the histogram for image blocks is broader and denser (FIG. 12);

measuring the variance for pixels of value different from the average background value. "Text" blocks and "graphics" blocks have a value that is small compared with "image" blocks;

computing cross-variance over a 3□3, 5□5, 7□7, and 9□9 neighborhood.

signal are extracted by making successive searches for maxima in the cumulated histogram. The method begins by computing the histogram of the signal or its transform (e.g. a wavelet or a Fourier type transform). Thereafter, a search is made for the maximum in the cumulated histogram $H_c(m)$ over a segment of size T using the equation:

$$H_c(m) = \sum_{j=m-T/2, m+T/2} H(j)$$

A number is given to the first maximum obtained and this number is propagated by applying a dynamic threshold. A range is retained if its size is sufficient.

The histogram computation is repeated for points that have not been processed and a new maximum is found, and then propagation is restarted using dynamic thresholding. This step is reiterated until at least 90% of the points have been processed. An RLSA type method for plugging holes serves to connect together ranges having the same number and that are not far apart.

In a video signal, for example, a VIMAS agent for indexing video type components can include a segmenting agent enabling successive images that resemble one another to be grouped together so as to form a homogeneous Note:

val is the value of the pixel for I(0,0);

v[1][4] is the value of the pixel for I(-4,-4);

v[4][4] is the value of the pixel for I(4,4); etc.

$m_i$ mean in a cross of size I□i;

$vc_i$ variance in a cross of size I□i;

$m_3 = (v[1][1]+V[2][1]+v[3][1]+v[4][1]+\text{value})/5$ $VC_3 = (v[1][1]^2+v[2][1]^2+v[3][1]^2+v[4][1]^2+\text{value}^2)/5 - m_3^2$ The values of $vc_i$ serve to characterize text, graphics, and image blocks that it has not been possible to determine in the past using conventional classification methods such as linear classifiers, parametric classifiers, or non-parametric classifiers, e.g. KEMAN (K closest neighbors).

Other types of segmentation agent serving to separate homogeneous components of a multimedia document or homogeneous objects from within homogeneous components can naturally also be implemented. Examples of homogeneous objects include in particular key frames of a video signal, zones of text within a frame or an image, specific shapes, characters, sound, rhythm, . . . .

The segmentation process described above with reference to images and blocks of text can be applied in similar manner using the same approach based on histograms for extracting elements from a sound component of a multimedia document.

Under such circumstances, the various homogeneous components (range, musical note, rhythm, . . . ) of a sound sequence of images, some of which may themselves in turn be processed by an IMAS agent for indexing image type components.

Homogeneous sequences of images can be identified by resolving into wavelets and then comparing bidirectional histograms of successive images.

As already mentioned above, during the archiving stage, objects (text, images, video signals, sound, animated vector graphics) constituting a multimedia document supplied by an acquisition module are identified, and then the content thereof and the relationship graph between said components (structure) are analyzed by specialized agents in order to extract and structure each component into homogeneous objects and finally produce a composite signature which characterizes and represents the content of all of the elements making up the multimedia document. The composite signatures are stored in database 101 so as to be compared in order to locate the desired documents.

During the searching stage, the document search interface 40, the search driving agent 303 of the document server 300, and the specialized searching agent 122 of a memory module 100 co-operate in order to identify a document within a large volume of multimedia documents.

Requests can mix text, sound, and picture aspects, using interrogation by content for all three cases. For picture data, the idea is to find images or sequences of images having a signature that satisfies certain visual criteria (texture, color, shape, fragment specified by the operator) or semantic criteria (textual description and relationship graph for objects present in the image, . . . ). Sound requests express the need to find signals (e.g. musical notes) that are similar. By using linguistic analysis techniques, text is interrogated using natural language. The system can find documents written in a language other than the language used for formulating the question. Free-form text searching can be performed by using tools for analyzing syntactic structure and reformulation mechanisms.

Requests are processed by the document server 300 which analyzes the content of composite requests, and then as a function of the profile of the operator, of the capacity of each indexing and search agent, and of the context of the environment, invokes appropriate search engines and then formulates responses.

In order to locate the desired documents, the search process makes use of the information produced during the archiving stage. The process of locating desired information is totally transparent to the operator. The operator interacts with the system via a visual interface and uses multimode composite questions. These questions are made up of one or more individual questions: text questions expressed in natural language, picture questions (e.g. by example), and even sound questions. These individual questions are connected together by logic operators (AND, OR, NOT), predicates/attributes (is a title, title of, summary, subject matter, ... ), and factorizing operators. These various links express the constraints that the response documents must satisfy. Thus, by way of example, a composite question may be constituted by two individual questions, one of them a text question (Text1) and the other a picture question (Image1), and the link between them can be a predicate defined as follows (Text1 is_the_legend_of Image1). This predicate expresses the constraint that only documents containing the text "Text1" and the image "Image1" and in which Text1 is the legend of Image1 are to be sent to the operator. This request can be executed in two different ways:

In a first method, a search is made initially for all documents containing images with legends. Thereafter, these documents are filtered so as to retain only those containing both "Text1" and "Image1". The first step of the search makes use solely of structural information about documents. However the second step makes use of the content of text and picture components.

A second method begins by locating in parallel all documents containing text components in which "Text1" is present and all documents containing picture components in which "Image1" is present. Thereafter, the structure of each document is analyzed so as to retain only those as requested by the operator: each response text component must be the legend of a response picture component.

Figures 3, 13:
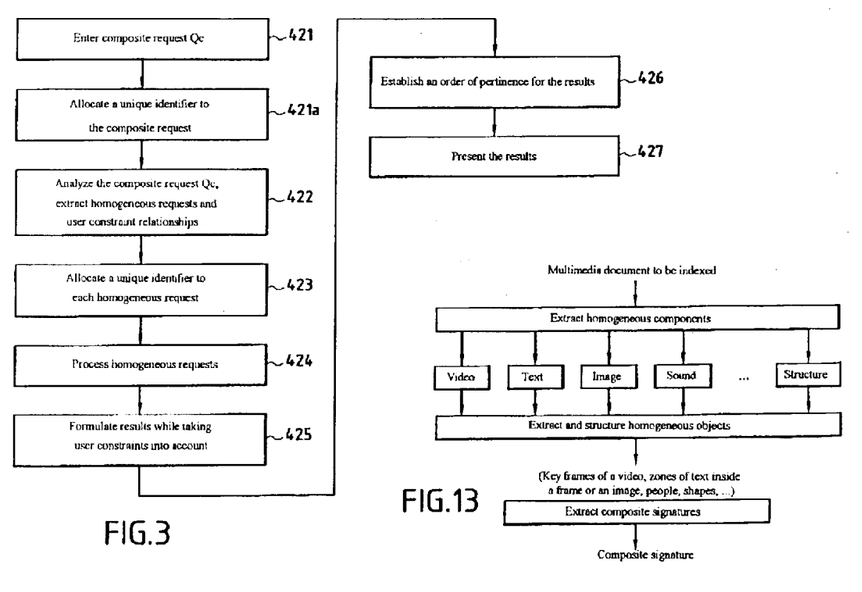
FIG. 3 is a flow chart showing the various steps in a method of the invention for searching for a multimedia document.
FIG. 13 is a block diagram showing the process of building up the composite signature of multimedia document.

The main steps of the multimedia document search method are shown in FIG. 3.

Step 421 consists in entering a composite request $Q_c$.

Step 421a consists in allocating a unique identifier to the composite request, this identifier serving to group together the responses to a given request.

Step 422 consists in analyzing the composite request $Q_c$ and in extracting homogeneous requests and user constraint relationships.

Step 423 consists in allocating a unique identifier to each homogeneous request.

Step 424 comprises processing homogeneous requests.

Step 425 consists in formulating responses that take account of user constraints.

Step 426 comprises sorting responses into an order of pertinence.

Step 427 consists in presenting the responses.

Figure 7:
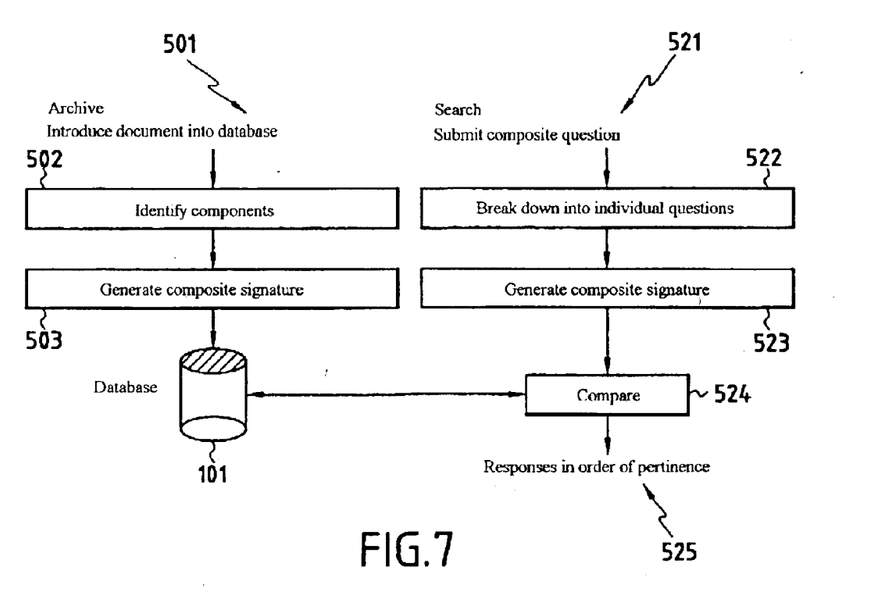
FIG. 7 is a flow chart showing the various steps implemented by an agent specialized in indexing (or archiving) and searching for multimedia documents.

FIG. 7 compares the main steps of an archiving process with the main steps of a search process.

During the archiving stage, there is thus a step 501 of introducing a multimedia document, a step 502 of identifying components, and a step 503 of generating a composite signature for archiving in the database 101.

During the search stage, there is a step 521 of submitting a composite question, a step 522 of breaking down the question, a step 523 of generating a composite signature, a step 524 of comparing the composite signature as generated with the composite signatures stored in the database 101, and a step 525 of providing responses in order of pertinence.

In order to express a request or question in a search stage, the user connects to the system via an access control process. Once this process has operated successfully, a home window opens to allow the user to express a composite request which is submitted to the document server 300.

Figure 5:
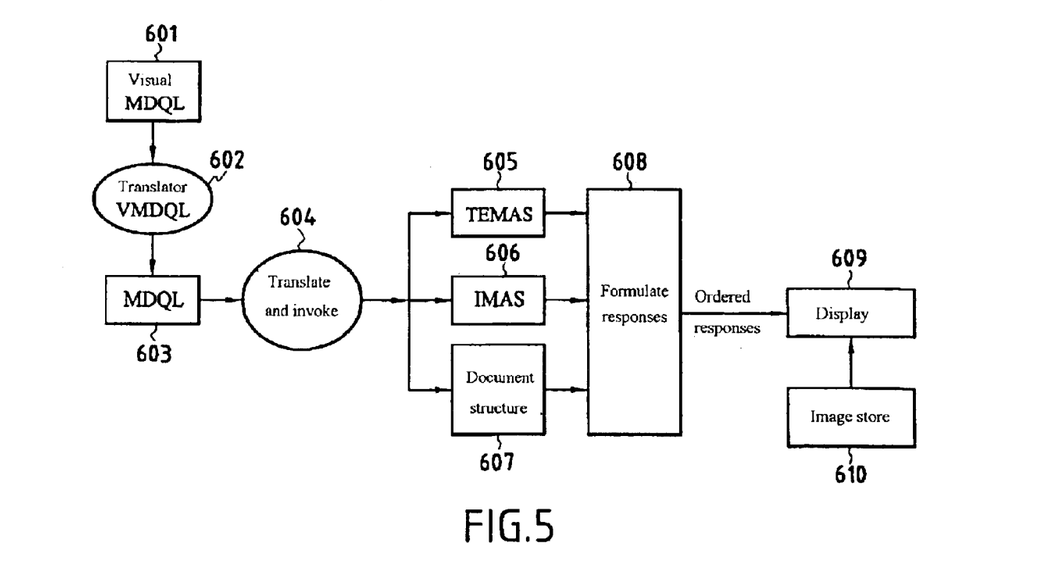
FIG. 5 is a block diagram showing the various steps of the method of the invention while acquiring and processing a composite request applied to documents made up of text and images.

In a particular embodiment shown in FIG. 5, the operator makes a request by using a visual description language known as visual multimedia document query language (VMDQL). Starting from the VMDQL request (module 601), the user interface (module 602) generates an MDQL script (module 603). In module 604, lexical, syntactic, and semantic analysis techniques are used firstly to analyze and verify that the syntax of the question complies with the grammar of the MDQL language, and secondly to translate the user's question into a script of invocations for applying to search agents (such as the TEMAS agent 506, the IMAS agent 606, or the agent 607 for searching document structure) involved in processing the request. The script also contains predicates expressing the manner in which the responses provided by the various agents are to be formulated (module 608 for formulating responses). The ordered responses are displayed (module 609) on the basis of data stored in the database (module 610).

Figure 6:
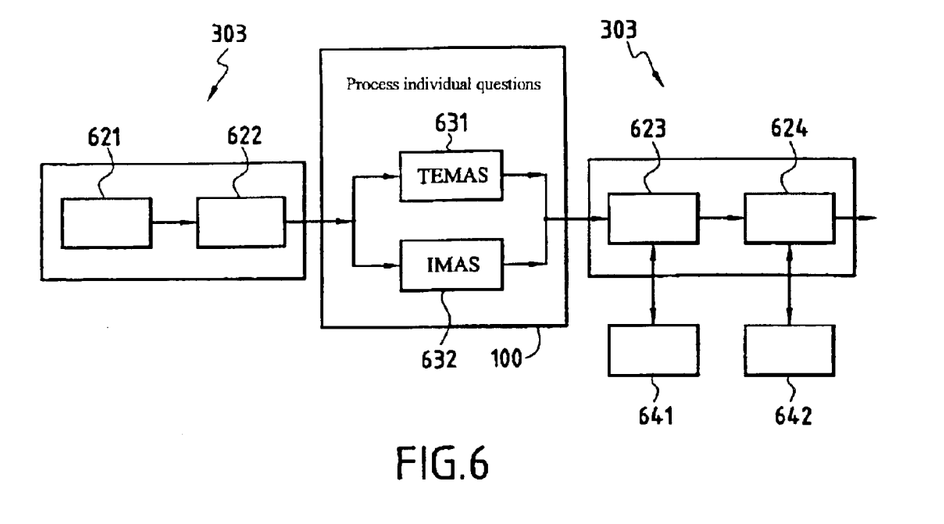
FIG. 6 is a block diagram showing the various functions performed in the management system of the invention while acquiring and processing a composite request applied to documents containing text and images.

The search driver agent 303 of the document server 300 in charge of inputting a question and ensuring that it is processed is made up of a certain number of individual modules (see FIG. 6).

A request analysis module 621 analyzes and breaks down the composite question or request into individual questions, and then for each of them it uses the invocation module 622 to invoke the most appropriate search agent within the memory module 100. The TEMAS agent 631 can thus be invoked for processing text questions while the IMAS agent 632 is invoked for processing picture questions. Each of these agents indexes the questions it receives, and then in order to determine a similarity score it compares these indexes with those that were produced during the archiving stage. These agents have a local view only of the document, receiving only those components which concern them together with an object connecting each of the blocks to its original document. Thus, the response returned by a search agent is constituted by a sequence of triplets (score, reference (idDocument) of the object associated during the archiving stage with the original document, component identifier (idComponent).

More particularly, requests are processed and responses are formulated in four stages:

1. Terms of a given type are grouped together: in order to encourage local response formulation (within search agents) and applying the process of factorizing and permutating logic operators, terms of the same type in the constraint equation are grouped together. Thus, for example, the constraint equation:
Text1 and Image1 and Text2 can be written:
Text1 and Text2 and Image1.
In equation (1) the requests Text1 and Text2 are sent to the TEMAS agent and Image1 is sent to the IMAS agent. After these requests have been processed, the TEMAS agent returns two lists of responses textAnswers1 and textAnswers2, while the IMAS agent returns a single list of response pictureAnswer (since it receives only one request). The three lists are merged (AND operation) in the document server 300.

In equation (2), the lists are merged in two steps, the responses textAnswers1 and textAnswers2 being merged locally in the TEMAS agent. The result is sent to the document server to be merged with the result sent by the IMAS agent. The advantage of this approach is that it reduces the time required to transfer responses and the space needed for storing intermediate responses in the document server.

2. Creating a unique identifier for the request and invoking search agents by passing to each of them the list of atomic requests that each of them is to receive. Thereafter, each agent processes the requests that have been allocated to it. To shorten time, and if the resources make this possible, requests are processed in parallel. The way parallel processing is managed (i.e. creating and distributing tasks, and coordinating processes, are functions of the system base) is transparent to the user.

3. Responses of the same type are merged locally in the search agent and then the response lists are merged globally in the document server. To ensure that the search process is effective and robust, invocation, request processing, and response merging, whether local or global, are all performed by respective automatons. For reasons of clarity, the grammar of such an automaton is described taking inspiration from the syntax of YACC ( ). YACC (for "yet another compiler compiler") is a semantic analyzer generator, i.e. a program which converts a grammatical specification of a language into an analyzer for said language. A grammar is constituted by a certain number of production rules. YACC enables each of these rules to be associated with an action which is executed when the rule is satisfied. This action is written in the C/CC++ language with conventions that enable the code written to be associated with the grammar:

```
ConstraintEquation : unaryConstraint ConstraintEquation (1)
    {
        action1 ( ... ) { ... }
    }
    | binaryConstraint ConstraintEquation (2)
    {
        action2 ( ... ) { ... }
    }
    ;
```

In this example, the grammar is constituted by two production rules (1) and (2). Rule (1) is associated with action1( ) which is executed once the rule has been resolved. For more detail see (lex & YACC by John R. Levine, Tony Masson and Doug Brown, published by O'Reilly & Associates, Inc.).

The grammar of the automaton used for processing a multimedia request and for formulating responses is constituted by twenty production rules (1), each of which is associated with an action.

```
(1) constraintEquation ::    unaryConstraint
{
transmit the final result to the document server
action1
}
(2)         | binaryConstraint
{
transmit the final result to the document server
action2
}
(2) bis    | n-aryConstraint
{
transmit the final result to the document server
action2
}
(3)         | unaryConstraint OPERATOR constraintEquation
{
merging by the memory module of the response lists as
they arrive and forwarding the final result to the
document server
}
(4)         | binaryConstrain OPERATOR constraintEquation
{
merging by the memory module of the response lists as
they arrive and forwarding the final result to the
document server
}
(4bis)     | n-naryConstrain OPERATOR constraintEquation
{
merging by the memory module of the response lists as
they arrive and forwarding the final result to the
document server
}
(5)         | (constraintEquation)
{
forwarding the final result to the document server
}
(6)         | EMPTY
    ;
(7) binaryConstraint:: homogeneousBinary
{
forward the result list to the memory module
}
(8)         | heterogeneousBinary
{
forward the result list to the memory module
}
    ;
(9) unaryConstraint::       TEXT
{
invoke TEMAS; process the request and transmit the
responses
}
(10)       | TEXT ATTRIBUTE
{
invoke TEMAS; process the request; filter the results
locally and transmit the response lists
}
(11)       | PICTURE
{
invoke IMAS; process the request and transmit the
response list to the document server
}
(12)       | PICTURE ATTRIBUTE
{
invoke IMAS; process the request; filter the results
locally and forward the responses
}
(11bis)   | SOUND
{
invoke AMAS; process the request and forward the response
list to the document server
}
(12bis)   | SOUND ATTRIBUTE
{
invoke IMAS; process the request; filter the results
locally and forward the responses
}
        ;
```

-continued

```
(13) heterogeneousBinary:: TEXT OPERATOR PICTURE
{
invoke TEMAS and IMAS respectively to process the text
request and the picture request, then forward the two
response lists to the memory module which merges the
responses
}
(14)       | PICTURE OPERATOR TEXT
{
invoke TEMAS and IMAS respectively to process the text
requests and the picture requests and then forward the
two response lists to the memory module which merges the
responses
}
  ;
(15) homogeneousBinary:: | TEXT OPERATOR TEXT
{
invoke TEMAS to process both text requests and then merge
the two response lists locally and forward the result
list to the memory module
}
(16)       | PICTURE OPERATOR PICTURE ;
{
invoke IMAS to process both picture requests and then
merge both response lists locally and forward the result
list to the memory module
}
  ;
```

In the twenty rules of grammar above, rule 1 means that there exists a unary constraint (e.g. only one image, text, sound, or video component).

Rule 2 means that there exists a binary constraint (e.g. there exists two image, text, sound, or video components).

Rule 2b is means that there exists an n-ary constraint (e.g. there exists more than two image, text, sound, or video components).

Rule 3 means that there exists a unary constraint associated by means of an operator with the constraint equation.

Rule 4 means that there exists a binary constraint associated by an operator with the constraint equation.

Rule 4b is means that there exists an n-ary constraint associated by an operator with the constraint equation.

Rule 5 means put into parentheses.

Rule 6 corresponds to a stop condition after analysis.

Rule 7 corresponds to the case of a homogeneous binary constraint (for example there exists two components of the same type, i.e. of the image type or of the text type or of the sound type or of the video type).

Rule 8 corresponds to the case of a heterogeneous binary constraint (for example there exists two components that do not both belong to the same type, such as text and image, sound and image, . . . ).

Rule 9 means that the unary constraint corresponds to a text component.

Rule 10 means that there exists a text attribute (e.g. "is a title").

Rule 11 means that the binary constraint case corresponds to an image component.

Rule 12 means that there exists an image attribute (for example "is a video image").

Rule 11 is means that the binary constraint case corresponds to a sound component.

Rule 12b is means that there exists a sound attribute (e.g. "is a video sound").

Rule 13 means that in the heterogeneous binary case, a text is associated by an operator with an image (the operator could be constituted, for example by "is on the same page", "is the legend of").

Rule 14 means that in the heterogeneous binary case, an image is associated by an operator with a text (the operator could be constituted, for example, by "is to the left of").

Rule 15 means that in the binary homogeneous case, a text is associated by an operator with a text (the operator could be constituted, for example, by "is the title of").

Rule 16 means that in the binary homogeneous case, an image is associated by an operator with an image (the operator being constituted, for example, by "is in the same document as").

A response analysis module 623 collects the responses sent by the various search agents. It uses the constraints expressed by the user. In the module 641 it recovers the structures of the response documents from the database 101. After analyzing these structures to filter and compute the pertinence score of each response and determine which responses match the expectations of the user, a module 624 groups the results of the search together and communicates with the document storage module 642 of the database 101 in order to supply the requested results. The results of the search are sent in the form of ordered lists using a criterion formulated by the various proximity computations implemented.

Figure 4:
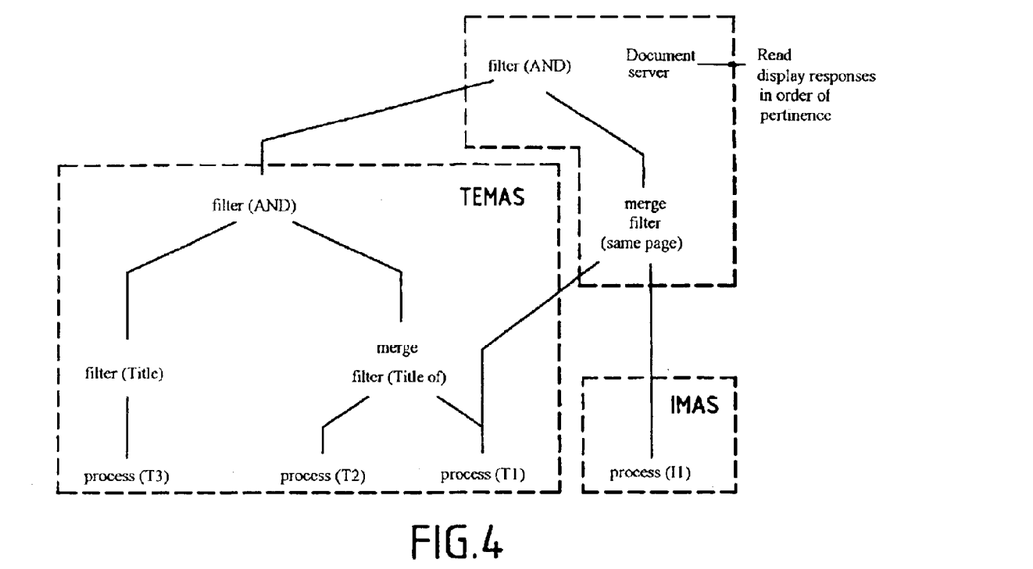
FIG. 4 is a diagram showing how requests are formulated and how co-operation is achieved between these various processing modules of the management system of the invention in an example of a search for a multimedia document.

FIG. 4 shows an example of a composite request constituted by a visual request, firstly translated into a text question with the following definitions:

$T_1$=text object $I_1$=image object $T_2$=text object $T_3$=text object

"$T_1$ is the title of $T_2$" and "$T_3$ is a title" "$T_1$ and $I_1$ are on the same page".

The constraints defined by the user are thus three in number in this case, thus constituting three individual or atomic questions.

The first constraint "$T_1$ is the title of $T_2$" constitutes a binary question (rule 2) that is homogeneous (rule 7) with an operator "is the title of" (rule 15).

The TEMAS agent dedicated to searching for text type objects is thus invoked to search for documents that include the texts $T_1$ and $T_2$, and then the responses are merged with filtering by the relationship "is the title of" so as to retain only those response documents in which the responses corresponding to $T_1$ are titles of $T_2$.

A sorted list of document references $D_1, D_2, \ldots, D_n$ are retained together with the identifiers of documents that satisfy the question "$T_1$ is the title of $T_2$".

Thereafter, the second constraint is processed having the attribute "$T_3$ is a title".

This question is of the unary type (rule 1) and it concerns text (rule 9).

The search agent TEMAS is invoked which returns the documents in which the text $T_3$ or a similar text appears. Filtering is performed using the relationship "is a title" which is associated with the title $T_3$, and a list of documents $D'_1, D'_2, \ldots$ is retained having document identifiers that satisfy the question "$T_3$ is a title".

Thereafter, local merging is performed in the TEMAS agent between the lists $D_1, D_2, \ldots$ and $D'_1, D'_2, \ldots$ with filtering by the AND operator so as to retain only those documents that are common to both lists.

The constraint "$T_1$ is on the same page as I" constitutes a binary relationship (rule 2) that is heterogeneous (rule 8) and that involves an operator (rule 13).

The agents TEMAS and IMAS are therefore invoked respectively to process the text request ($T_1$) and the picture request ($I_1$). The two lists of responses are forwarded to the document server which merges the responses, filtering with the relationship "is on the same page as").

Finally, the document server performs merging with filtering using the AND operator between the lists of documents as obtained firstly from the preceding processing and secondly from the filtering that has previously been performed in the TEMAS agent.

A pertinence score is calculated on each filtering operation. The score propagates and is updated by each filter. It is also possible to have partial data processing, such as for example "retain only those responses that are later than a certain date".

In general, in a composite request, an individual request is processed within a single processing module if it is homogeneous, and responses are formulated at the same level, but an individual request that is heterogeneous and therefore implies action by a plurality of processing modules is processed both locally and globally within the search drive agent 303 of the document server 300.

What is claimed is:

1. A method of managing a multimedia database, the method being characterized in that it comprises the following steps:

creating an identifier allocator agent for associating a unique reference with each representative element of a multimedia document at each step of the processing;

acquiring a multimedia document of heterogeneous content comprising information belonging to at least one of the following categories: image, video, sound, text, animated vector graphics;

indexing the multimedia document, where indexing comprises:
  a1) analyzing the multimedia document both to extract both homogeneous components each belonging to a category of the same type, and also to extract relationships between said homogeneous components;
  b1) characterizing the content of each of the homogeneous components and establishing relationships between the elements of the content of each of said homogeneous components;
  c1) establishing the relationships, if any, between the elements belonging to the contents of different homogeneous components; and
  d1) producing a composite signature combining the indices of each of the homogeneous components, the previously identified relationships, and all of the previously acquired identifiers;

storing the indexed multimedia document together with its composite signature; and searching a multimedia document as previously indexed and stored on the basis of a composite request, searching comprising:
  a2) analyzing the composite request to extract firstly homogeneous requests referring to a category of a single type, and secondly user constraint relationships expressed in the composite request;
  b2) processing homogeneous requests;
  c2) formulating results of processing homogeneous requests while taking user constraint relationships into account; and
  d2) establishing a pertinence order for the results and presenting the results.

2. A method according to claim 1, characterized in that while searching for a previously indexed and stored multimedia document, during the processing of homogeneous requests, the response returned by a search agent is constituted by a sequence of triplets each comprising: a similarity score after comparing the composite signatures of requests with the composite signatures prepared during the indexing stage; the identifier of the object associated during the indexing stage with the original document; and the identifier of a component of the homogeneous request.

3. A system for managing a multimedia database, the system being characterized in that it comprises:
  a) a set of specialized operational units comprising at least:
    a1) an acquisition module;
    a2) a multimedia database;
    a3) at least one indexing agent that can be subdivided into at least two subagents each using a specific mode of processing;
    a4) at least one search agent that can be subdivided into at least two subagents each using a specific mode of processing;
    a5) an agent dedicated to managing information relating to document structure;
    a6) a module for analyzing the content of an input multimedia document and for extracting and structuring components from the document;
    a7) a user interface having:
      a7-1) a document indexing interface; and
      a7-2) a document search interface;
    a8) a module for creating, starting, and destroying a multimedia database; and
    a9) a module enabling a user to open a session and control the module for creating, starting, and destroying a multimedia database;
  b) a set of specialized functional units comprising at least:
    b1) an agent for arranging various units of the system;
    b2) an agent for driving document indexing;
    b3) an agent for driving document searching; and
    b4) an identifier manager; and
  c) an interconnection and intercommunication platform for the specialized operational units and the specialized functional units.

4. A system according to claim 3, characterized in that said indexing agent that can be subdivided into at least two subagents is an agent serving to index objects of image type, and in that said search agent that can be subdivided into at least two subagents is an agent serving to search for objects of image type.

5. A system according to claim 3, characterized in that said module for analyzing the content of an input multimedia document and for extracting the structure of document components comprises a first unit for processing and analyzing an image or a signal, for statistical analysis, for modelling, and for classification to group together the elements of an input document into homogeneous components, and a unit for producing the structure of the document or an object graph establishing the relationships between the various components of the document.

6. A system according to claim 3, characterized in that it includes an indexing agent for indexing objects of text type and a serach agent for searching for objects of text type.

7. A system according to claim 3, characterized in that it includes an indexing agent for indexing objects of sound type and a search agent for searching for objects of sound type.

8. A system according to claim 3, characterized in that it includes an analysis agent for extracting image objects, sound objects, and objects characterizing the dynamic behavior thereof, and indexing agent for indexing video type objects, and a search agent for searching for video type objects.

9. A system according to claim 3, characterized in that the multimedia database comprises both references to documents to be archived and composite signatures constituted by characterizing components of archived documents and by descriptions of the structure of archived documents identifying the relationships between the components of archived documents.

10. A system according to claim 3, characterized in that it comprises a plurality of modules for analyzing the content of an input multimedia document and for extracting and structuring components of the document, each of these modules for analyzing contents, extraction, and structuring being adapted to a specific type of document identified by the nature of its content (image, text, sound, video).

* * * * *

UNITED STATES PATENT AND TRADEMARK OFFICE
CERTIFICATE OF CORRECTION

PATENT NO.       : 6,925,475 B2                                    Page 1 of 1
APPLICATION NO.  : 10/270271
DATED            : August 2, 2005
INVENTOR(S)      : Hassane Essafi et al.

It is certified that error appears in the above-identified patent and that said Letters Patent is hereby corrected as shown below:

Column 10, line 61, "{" should read --}--;

Column 10, line 63, "}" should read --{--;

Column 13, line 43, "I□i" should read --i□i--;

Column 13, line 44, "I□i" should read --i□i--;

Column 19, line 32, "2b is" should read --2bis--;

Column 19, line 39, "4b is" should read --4bis--;

Column 19, line 59, "11 is" should read --11bis--; and

Column 19, line 61, "12b is" should read --12bis--;

Signed and Sealed this

Twelfth Day of September, 2006

JON W. DUDAS
*Director of the United States Patent and Trademark Office*